H. W. PLEISTER.
EXPANSION BOLT ANCHOR.
APPLICATION FILED JAN. 16, 1908.
929,979.
Patented Aug. 3, 1909.
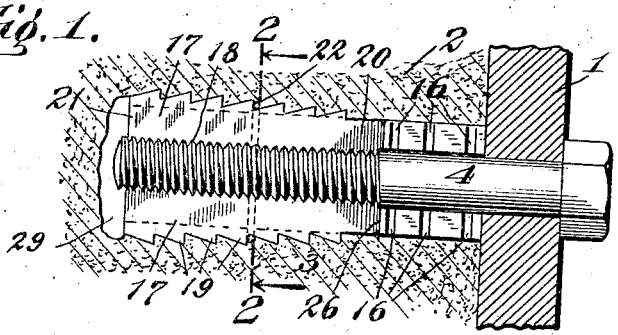
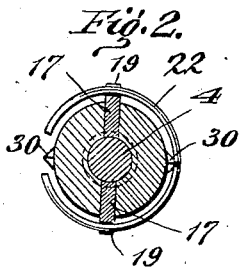
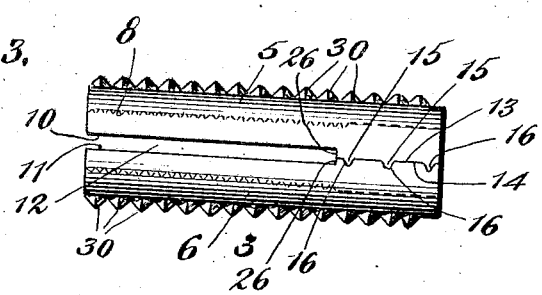
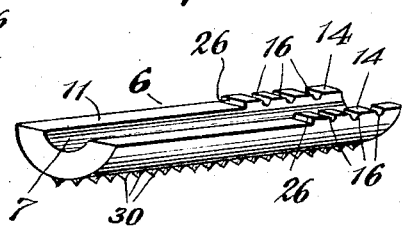
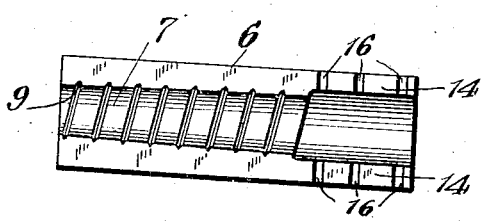
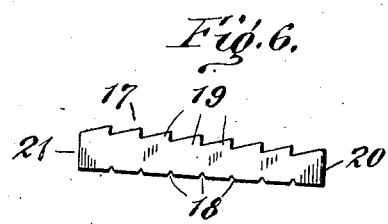
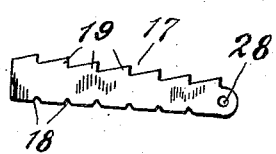
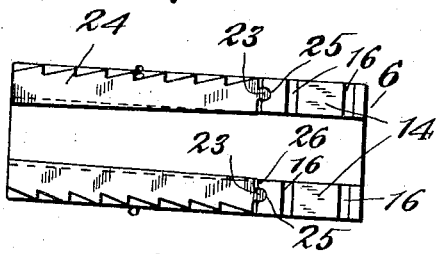
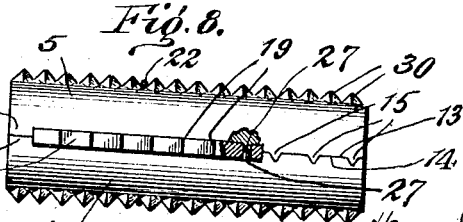

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY.

EXPANSION-BOLT ANCHOR.

No. 929,979.      Specification of Letters Patent.      Patented Aug. 3, 1909.

Application filed January 16, 1908. Serial No. 411,142.

*To all whom it may concern:*

Be it known that I, HENRY W. PLEISTER, a citizen of the United States, and a resident of Westfield, in the county of Union and State of New Jersey, have invented certain new and useful Improvements in Expansion-Bolt Anchors, (Case D,) of which the following is a specification, taken in connection with the accompanying drawings, which form a part of the same.

This invention relates to expansion bolt anchors wherein the gripping action is performed by radially movable gripping members and by the shields which are also movable with relation to each other.

In the accompanying drawings showing an illustrative embodiment of this invention and in which the same reference numerals refer to similar parts in the several figures, Figure 1 is a plan view of one of the shields of my bolt anchor showing machine screw threads in the shield and on the bolt, the expanders being shown in position, and a portion of the figure being illustrated in longitudinal section. Fig. 2 is a transverse vertical section on the line 2—2 of Fig. 1 looking in the direction of the arrows. Fig. 3 is a side elevation of the bolt anchor showing the screw threads in dotted line. Fig. 4 is a perspective view of one of the shields. Fig. 5 is a plan view of one of the shields provided with screw threads for a lag screw. Fig. 6 is a side elevation of one of the expanders. Fig. 7 is a plan view of one of the shields showing a slight modification. Fig. 8 is a side elevation of a modified form of bolt anchor. Fig. 9 is a side elevation of one of the expanders showing a different manner of pivoting it.

In the illustrative embodiment of the invention shown in the drawings, 1 is a supported member which it is desired to secure to the support 2 of masonry, brick, cement or any other material, by my improved expansion bolt 3 and machine bolt 4, though it is to be understood of course, that a lag screw, or any other suitable expanding means may be employed.

My improved bolt anchor may be formed of a plurality of shields, two such shields 5 and 6 being shown in the drawings, though my invention is not limited to this number. In the form illustrated the two shields when placed together make a substantially cylindrical hollow body, the interior of each shield being provided with a tapering bore 7 which is preferably, though not necessarily, screw-threaded either with threads 8 to fit the machine screw threads upon the bolt 4, Fig. 1, or with screw threads 9, Fig. 5, to coöperate with the threads of a lag screw.

The meeting surfaces of one or both of the shields 5 and 6 are cut away, as shown at 10 and 11, Fig. 3, forming a slot 12 when the shields are placed together, Fig. 3. On the meeting surfaces 13 of the shield 5 and upon the meeting surfaces 14 of the shield 6 I preferably, though not necessarily, place sockets or recesses and enlargements or ribs to coöperate with each other. It is immaterial on which member these are placed or the number used. In the drawings I have shown the projections or ribs 15, 15, upon the shield 5 and the sockets or recesses 16, 16, upon the shield 6, this arrangement, however, may be reversed and the number of these parts varied without departing from my invention.

Within the slots 12 I mount my expanders 17, 17, so that they may have an outward radial movement being actuated in this direction upon the insertion of either the lag screw, machine bolt or any other suitable means. These expanders may be formed of any suitable material. Preferably I stamp them out of any suitable metal forming at the same time upon them teeth 19, 19, and mutilated screw threads 18, 18, to correspond with the screw threads upon the machine bolt or lag screw or any other suitable means. It is to be understood, however, that both the teeth and mutilated screw threads upon the expanders may be omitted. When the expanders are made of softer material than the threads upon the machine bolt, lag screw or other expanding means, complementary threads will be cut in the expanders by the threads upon the bolt or screw. These expanders 17 are preferably though not necessarily formed with a taper, their end 20 being narrower than the end 21, the difference, or taper, being varied when desired to regulate the radial movement or throw of the expanders.

In the collapsed or inoperative position of the expanders their outer surface, or teeth 19, 19, when such are used, lie within the circumference of the bolt anchor 3 being held in this position by any suitable means, such for instance as by the split spring ring 22, Figs. 1 and 2.

While I preferably loosely mount the expanders 17, 17 within the slots 12, 12, I may, however, pivot them within the slots in any suitable manner. In Fig. 7 I have shown a lug 23 formed on the expander 24 and a recess 25 in the surface 26 of the shield though this arrangement may be reversed. They may be pivoted, however, in any suitable manner, as by casting or otherwise securing lugs or pins 27, 27, on the surfaces 10 and 11, permitting one or both of the lugs coöperating with a hole 28 in one end of the expander, see Fig. 8. Moreover to confine the expanders and prevent their movement along the axis of the substantially cylindrical bolt anchor 3, I preferably, though not necessarily form or otherwise secure lips 31, 31 upon one or both of the shields 6 and 7, Fig. 8. If only one lip is used it should be of substantially the same thickness as the expander which it is to confine. In some cases it may not be desirable to form threads upon either the expanders or upon the shields, as shown for instance in Fig. 7.

In handling and shipping the bolt anchors the shields and expanders are preferably secured together in any suitable manner, as by the split spring ring 22, the ribs 15 and socket 16 coöperating to prevent relative movement of the shields. These ribs and sockets furthermore prevent relative movement of the shields upon the insertion and manipulation of the lag screw or machine bolt.

The bore 7 of the different shields is preferably though not necessarily tapered to coöperate with the machine bolt or lag screw to permit the screw or bolt not only forcing outward or radially the expanders 17, 17, but also the shields 5 and 6. These shields are forced away from each other and supplement the powerful gripping action of the expanders 17, 17 upon the walls of the hole 29 in the masonry or other suitable support 2. The friction of the shields 5 and 6 may be increased, if desired, by forming teeth or serrations 30, 30 upon their exterior surfaces.

Having thus described this invention in connection with an illustrative embodiment thereof, to the details of which I do not desire to be limited, what is claimed as new and what it is desired to secure by Letters Patent is set forth in the appended claims.

1. In a bolt anchor, the combination of a plurality of radially movable shields, and one or more radially movable expanders supported by the shields.

2. In a bolt anchor, the combination of a plurality of radially movable shields, and one or more pivoted expanders supported by the shields.

3. In a bolt anchor, the combination of a plurality of movable shields, one or more of the shields having a cut away portion and one or more recesses, one or more ribs upon the complementary shields, and one or more expanders mounted in the cut away part of the shield or shields.

4. In a bolt anchor, a plurality of separate shields each having a bore, and pivoted expanders carried or supported by the shields.

5. In a bolt anchor, a plurality of separate shields each having a tapering bore and a cut away portion, and one or more pivoted expanders mounted in the cut away portion of the shields.

6. In a bolt anchor, two separate shields, a bore in each shield, a lip upon each of the shields to assist in confining the expanders, each shield having a reduced or cut away portion, and expanders mounted in the cut away portion.

7. In a bolt anchor, two separate shields, a bore in each shield, each shield having a reduced or cut away portion, pivoted expanders mounted in the cut away portions, one or more recesses or sockets in one of the shields and one or more ribs in the other shield.

8. In a bolt anchor, two separate shields, a bore in each shield, each shield having a reduced or cut away portion, pivoted tapering expanders mounted in the cut away portion, and ribs and recesses or sockets upon the shields.

9. In a bolt anchor, two separate shields, a bore in each shield, each shield having a reduced or cut away portion, expanders mounted in the cut away portion, and a lip upon one of the shields, to assist in confining the expanders.

HENRY W. PLEISTER.

Witnesses:
 MARGERY ADAMSON,
 ALAN M. JOHNSON.